3,096,239
Patented July 2, 1963

3,096,239
METHOD FOR PEST CONTROL EMPLOYING POLY-CHLOROPOLYHYDRIC ALCOHOLS
Paul E. Hoch, Youngstown, and Jack S. Newcomer, Wilson, N.Y., assignors to Hooker Chemical Corporation, Niagara Falls, N.Y., a corporation of New York
No Drawing. Filed July 23, 1962, Ser. No. 211,897
10 Claims. (Cl. 167—30)

This invention relates to a method for the control of pests, i.e., insects, mites, fungi, snails, slugs, marine fouling organisms and the like. More specifically, the concept of this invention resides in the control of pests by the application to the locus of said pest, a toxic amount of the reaction product of decachlorooctahydro-1,3,4-metheno-2H-cyclobuta-(cd)-pentalene-2-one ($C_{10}Cl_{10}O$) and an aliphatic polyhydric alcohol containing at least three hydroxyl groups.

This application is a continuation-in-part of S.N. 853,681, filed November 18, 1959, now U.S. 3,055,948.

The active toxicants utilized in the method of the present invention are characterized by the following generic formula:

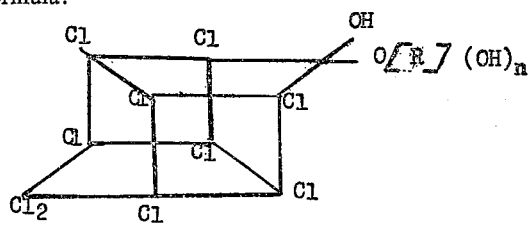

wherein $n$ is an integer equal to or greater than 2, and R is an aliphatic radical having at least three carbon atoms and bearing the OH groups and the hemiketal oxygen on separate carbon atoms. The preferred compounds are those wherein R has 3 to 6 carbon atoms.

The halogen-containing polyhydric alcohols may be simply and expeditiously prepared by dissolving decachlorooctahydro - 1,3,4 - metheno-2H-cyclobuta-(cd)-pentalene-2-one in a suitable solvent and heating with the desired polyol at ambient or elevated temperature, preferably in the range between about 20 degrees centigrade to 150 degrees centigrade. The time allowed for reaction will naturally vary with the purity of the reactants, the degree of completion of reaction desired, the reaction temperature, etc., but, generally speaking, from about one to about twenty-four hours are preferred.

The solvent which is employed should be capable of dissolving the decachlorooctahydro-1,3,4-metheno-2H-cyclobuta-(cd)-pentalene-2-one should be inert with respect to reactants and reaction products, and have a sufficiently high boiling point to allow for reaction at the desired temperatures without necessitating the application of superatmospheric pressure. Carbon tetrachloride is preferred for this purpose, but others that may be used include toluene, chlorobenzene, dioxane, etc. The product thus obtained may be isolated from solution by procedures known in the art, i.e., evaporation, addition of a non-solvent, cooling and the like.

While the preferred polyhydric alcohols have 3 to 6 carbon atoms, any aliphatic polyhydric alcohol may be used to react with decachlorooctahydro-1,3,4-metheno-2H-cyclobuta-(cd)-pentalene-2-one, provided it contains at least three hydroxyl groups. Typical polyhydric alcohols of 3 to 15 carbon atoms include the following: glycerol, polyglycerol, hexanetriol, butanetriols, trimethylolpropane, trimethylolethane, pentaerythritol, polypentaerythritol, mannitol, sorbitol, methyltrimethylolmethane, octanetriols, butenetriols, butynetriols, hexenetriols, hexynetriols, octenetriols, octynetriols, pentanetriols, hexanetriols, hexanepentaols, hexanehexaols, inositol, pentanetetraols, sucrose, glucose, cellulose and the like. The product produced employing glycerol is particularly preferred because of its low cost and high activity.

It is preferred to use equimolar proportions of aliphatic polyhydric alcohol to decachlorooctahydro-1,3,4-metheno-2H-cyclobuta-(cd)-pentalene-2-one, but an excess of either reactant may be employed.

The active toxicants of the invention can be described as polyhydric alcohol hemi-ketals of decachlorooctahydro-1,3,4-metheno-2H-cyclobuta-(cd)-pentalene-2-one wherein the alcohol is an aliphatic polyhydric alcohol containing at least three hydroxyl groups.

Decachlorooctahydro - 1,3,4 - metheno-2H - cyclobuta-(cd)-pentalene-2-one was formerly known incorrectly as decachlorotetrahydro-4,7-methenoindenone, and may be prepared by treating hexachlorocyclopentadiene with sulfur trioxide. Decachlorooctahydro - 1,3,4 - metheno-2H-cyclobuta-(cd)-pentalene-2-one has the formula $C_{10}Cl_{10}O$ and is believed to possess the box ketone structure below:

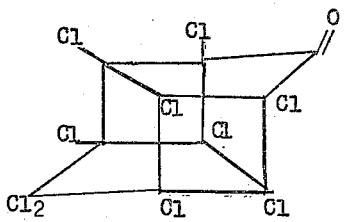

Toxic amounts of these polyhydric products constitute rates of application of at least 0.1 pound per acre in broadcast spray applications to control plant pests. No upper limit can, of course, be stated since this limit will depend only on economics, convenience, and safety. Even lower rates, down to 0.001 pound per acre can be employed where the toxicant is distributed in bait formulations such as for control of ants, roaches, grasshoppers, snails, slugs, millipeds and the like, since the pest will seek out the bait.

In application to a three-dimensional medium such as a body of water for aquatic larva control, rates of 0.1 part of toxicant per million parts of the treated medium produce an effect and rates around 1 p.p.m. are highly effective. Rates in this range (i.e., 0.1 p.p.m. to 1 p.p.m. and above) are effective in soil against soil-dwelling pests such as wireworms. In marine antifouling treatments where very prolonged control is required, concentrations of 1 percent and above in the paint film or in the treated wood are preferable.

For pesticidal use the halogen-containing polyhydric alcohols are generally formulated with adjuvants. Frequently, it may be desirable to modify or condition the physical properties of the pesticidal compositions. This can be done effectively by including one or more substances variously referred to as surface active agents, wetting agents, detergents, suspending agents, dispersing agents, thickening agents, emulsifying agents or the like. These substances which simplify or improve formulation or application frequently enhance or potentiate the scope, effectiveness or duration of these formulations and are generically referred to as adjuvants.

A satisfactory, but not exhaustive listing of these adjuvants may be found in "Soap and Chemical Specialties," vol. 31, No. 7, pages 50 to 61; No. 8, pages 48 to 61; No. 9, pages 52 to 67; and No. 10, pages 38 to 67 (1955), as well as Bulletin E–607 of the Bureau of Entomology and Plant Quarantine of the United States Department of Agriculture.

Compositions of this invention can be made up as solid formulations such as powders, wettable dusts, pellets, granules and the like, and may be hand or mechanically broadcast, disced, rototilled, plowed or otherwise admixed with or into the soil. Where liquid formulations are utilized, the solutions are sprayed onto the locus to be treated. The rate of application will be variable dependent upon such factors as soil structure, climate, stage of growth of the crop, type of insects, fungi or other pests encountered, and their stage of development. However, under average conditions the compositions of this invention are effective at the rates above indicated.

Further compositions of the instant invention can be utilized in the form of a bait. Bait formulations are made by admixing the toxicant with any substance which will entice, induce, compel or otherwise cause the animal pest to ingest the insecticidal composition no matter by what physiological mechanism the substance (bait) functions. Therefore, any substance which will entice, induce, compel or otherwise cause the pest to eat the insecticidal composition through appeal to its sense of taste, smell, sight or touch would be within the meaning and intent of the insecticidal compositions of this invention.

Suitable baits include alfalfa meal, beef fat, blood meal, bacon, beef bouillon, casein, corn, corn meal, cotton seed meal, chicken feed, dog food, dried apple, egg, fish meal, flour, honey, meat, oats, peanuts, peanut butter, peanut meal, raisins, sausage, sawdust, sugar, soybean meal, tankage, wheat, bran, whey, cattle feed, bread, crackers, St. Johns bread, chocolate, dog biscuits, packing house wastes, grain seeds, butter, bacon drippings, corn oil, soft drink syrup, cotton seed oil, lard, chocolate syrup, molasses, sugar syrup, peanut oil, vegetable oil, corn protein hydrolysate, soups and bouillons, mayonnaise, milk, cream and natural oils, fats, and proteins.

The following specific examples further illustrate the invention, however, this detailed disclosure is not to be construed as limiting the scope of the instant invention.

EXAMPLE 1

*Preparation of Glycerol Adduct*

Eighty grams of dry decachlorooctahydro-1,3,4-metheno-2H-cyclobuta-(cd)-pentalene-2-one were dissolved in three hundred cc. of carbon tetrachloride, and 15.1 grams of glycerol were added. The solutions which separated from the solvent on cooling as needle clusters were the expected adduct (65 grams), and had a melting point of 300 degrees centigrade.

*Analysis.*—Calcd. for $C_{13}H_8Cl_{10}O_4$: Cl, 60.9 percent; Found: Cl, 61.4 percent.

EXAMPLE 2

*Preparation of 1,2,6-Hexanetriol Adduct*

Twenty grams of decachlorooctahydro-1,3,4-metheno-2H-cyclobuta-(cd)-pentalene-2-one, 5.4 grams of 1,2,6-hexanetriol and 150 cc. of carbon tetrachloride were refluxed for about two hours, cooled and fifteen grams of the expected adduct were collected as crystals. They were recrystallized from carbon tetrachloride to give microcrystalline solids.

EXAMPLE 3

*Preparation of 1,2,4-Butanetriol Adduct*

Twenty grams of decachlorooctahydro-1,3,4-metheno-2H-cyclobuta-(cd)-pentalene-2-one, 4.3 grams of 1,2,4-butanetriol and two hundred and fifty cc. of carbon tetrachloride were refluxed for about two hours. The solvent was stripped, and 20 grams of the expected adduct were recovered as an oil which crystallized on standing.

The sorbitol and pentaerythritol adducts were prepared in a similar manner.

EXAMPLE 4

A wettable powder formulation was made up by blending and grinding in a hammer mill the following ingredients:

| | Parts by weight |
|---|---|
| Product of Example 1 | 50 |
| Marasperse N (lignin sulfonate dispersing agent) | 5 |
| Sorbit P (alkylaryl sulfonate wetting agent) | 2 |
| Microcel E (silicate carrier) | 43 |

EXAMPLE 5

A bait formulation suitable for ant control is made up by thoroughly blending 0.1 percent by weight of the product of Example 1 as 99.9 percent of peanut butter.

EXAMPLE 6

Marine antifouling paint formulations are made by ball-milling the following ingredients:

| Ingredient | Lbs. per 100 gals. |
|---|---|
| Gum rosin, Grade WW | 277 |
| Blown fish oil | 118 |
| Zinc stearate | 18 |
| Product of Example 1, 2 or 3 | 197 |
| Zinc oxide | 161 |
| Magnesium silicate | 56 |
| Solvent naphtha | approx.[1] 241 |
| Lampblack | 1 |

[1] Volume adjusted to 100 gal. by addition of naphtha.

EXAMPLE 7

A bait formulation suitable for cockroach control is made by thoroughly mixing 0.5 percent of the product of Example 2 and 99.5 percent of soybean meal.

EXAMPLE 8

The product of Example 1 was dispersed in water at the rate of 1 part of the compound per one million parts of water and live mosquito larvae were placed therein. After 24 hours, all of the larvae were killed.

EXAMPLE 9

The product of Example 1 in the form of a 50 percent wettable powder (as described in Example 4) was dispersed in water and sprayed at the rate of ½ pound of active ingredient per acre onto broccoli plants. Five-day-old cabbage looper larvae were then placed on the sprayed plants and on unsprayed control plants, and percent mortality noted at intervals. The following observations were made:

| | Percent mortality | | |
|---|---|---|---|
| | 48 hrs. | 72 hrs. | 96 hrs. |
| Sprayed plants | 10 | 62.5 | 99 |
| Unsprayed controls | 0 | 0 | 0 |

EXAMPLE 10

The product of Example 1 was admixed at concentrations of 0.1 and 1 percent with brown sugar to prepare baits. Caged adult houseflies were allowed to feed on these baits, and the mortality observed at intervals.

| | Percent mortality | | |
|---|---|---|---|
| | 24 hrs. | 48 hrs. | 72 hrs. |
| 0.1% active ingredient | 3 | 80 | 95 |
| 1.0% active ingredient | 23 | 97 | 100 |
| No toxicant | 0 | 5 | 5 |

Results obtained with the products of Examples 2 and 3 are closely comparable to the results with the product of Example 1.

EXAMPLE 11

Bait formulations containing 0.1 percent of the product of Example 1 in peanut butter were distributed in small pieces at a rate of 4 grams of active ingredient per acre in an area heavily infested with the imported fire ant. (*Solenopsis saevissima* var. *richteri*.) The worker ants of this species were seen to carry the bait to their nests. Within 8 days, the fire ant population in the area treated with both the 0.1 percent and the 1 percent baits had dwindled to less than 5 percent of the population noted before the treatment.

EXAMPLE 12

A 50 percent wettable powder formulation of the product of Example 1 was sprayed on orange trees at the rate of ½ pound of active ingredient per acre. Nearby trees were left unsprayed as a control area. Two weeks later, when a severe infestation of rust mite was seen to have developed on the unsprayed trees, the treated area was found substantially free of rust mites.

EXAMPLE 13

Porous test panels were impregnated with the product of Example 1 applied as a 5 percent solution in methyl-ethyl ketone. These panels, as well as untreated comparison panels were then immersed in the ocean near Miami Beach, Florida, for a period of eight weeks. Upon withdrawing the panels, the untreated panels were heavily fouled with a complex population of marine fouling organisms, while the treated panels showed the following degrees of fouling control (estimated on the basis of population of the larger fouling organisms or area of panel covered by the smaller organisms).

| Species: | Percent control |
|---|---|
| Barnacles | 95 |
| Algae | 95 |
| Annelids | 100 |
| Bryozoans | 100 |
| Tunicates | 100 |
| Amphipods | 100 |
| Hydroids | 100 |
| Molluscs | 100 |

EXAMPLE 14

Tomato plants inoculated with spores of Early Blight Diseaese (*Alternaria solani*) were sprayed with the products of Examples 1, 2 and 3, dispersed at 0.04 percent concentration in water. Inoculated plants were also left unsprayed for comparison. One week later, when severe leaf spotting had occurred on the unsprayed plants, the following percent repression of the disease (repression of number of leaf spots) was noted with the test chemicals:

| | Percent reduction of disease |
|---|---|
| Product Example 1 | 99 |
| Product Example 2 | 85 |
| Product Example 3 | 80 |
| Untreated | 0 |

The sorbitol and pentaerylthritol adducts were tested in a similar manner and found to have substantially the same activities.

The halogen-containing polyhydric alcohols are also useful in the preparation of pesticides and insecticides, e.g., by reaction with cyclic sulfites.

Various changes and modifications may be made in the method and apparatus of this invention, certain preferred forms of which have been herein described, without departing from the spirit and scope of this invention. These modifications of this basic invention are to be regarded as within the scope and purview of this invention.

We claim:

1. A method for controlling pests which comprises applying to the locus of said pests a toxic amount of a composition comprising a polyhydric alcohol hemi-ketal of decachlorooctahydro - 1,3,4 - metheno - 2H-cyclobuta-(cd)-pentalene-2-one wherein the alcohol is an aliphatic polyhydric alcohol containing at least three hydroxyl groups.

2. The method of claim 1 wherein the alcohol is glycerol.

3. The method of claim 1 wherein the alcohol is 1,2,6-hexanetriol.

4. The method of claim 1 wherein the alcohol is 1,2,4-butanetriol.

5. The method of claim 1 wherein the hemi-ketal is employed in combination with a bait.

6. The method of claim 1 wherein the pests controlled are insects.

7. The method of claim 1 wherein the pests controlled are mites.

8. The method of claim 1 wherein the pests controlled are fungi.

9. The method of claim 1 wherein the pests controlled are underwater fouling organisms.

10. The method of claim 1 wherein the pests controlled are ants.

References Cited in the file of this patent

McBee et al.: J.A.C.S., vol. 78 (1956), pp. 1511–1512.